INVENTOR.
HAROLD C. CROUCH
BY Bosworth, Sessions,
Herrstrom & Knowles
ATTORNEYS

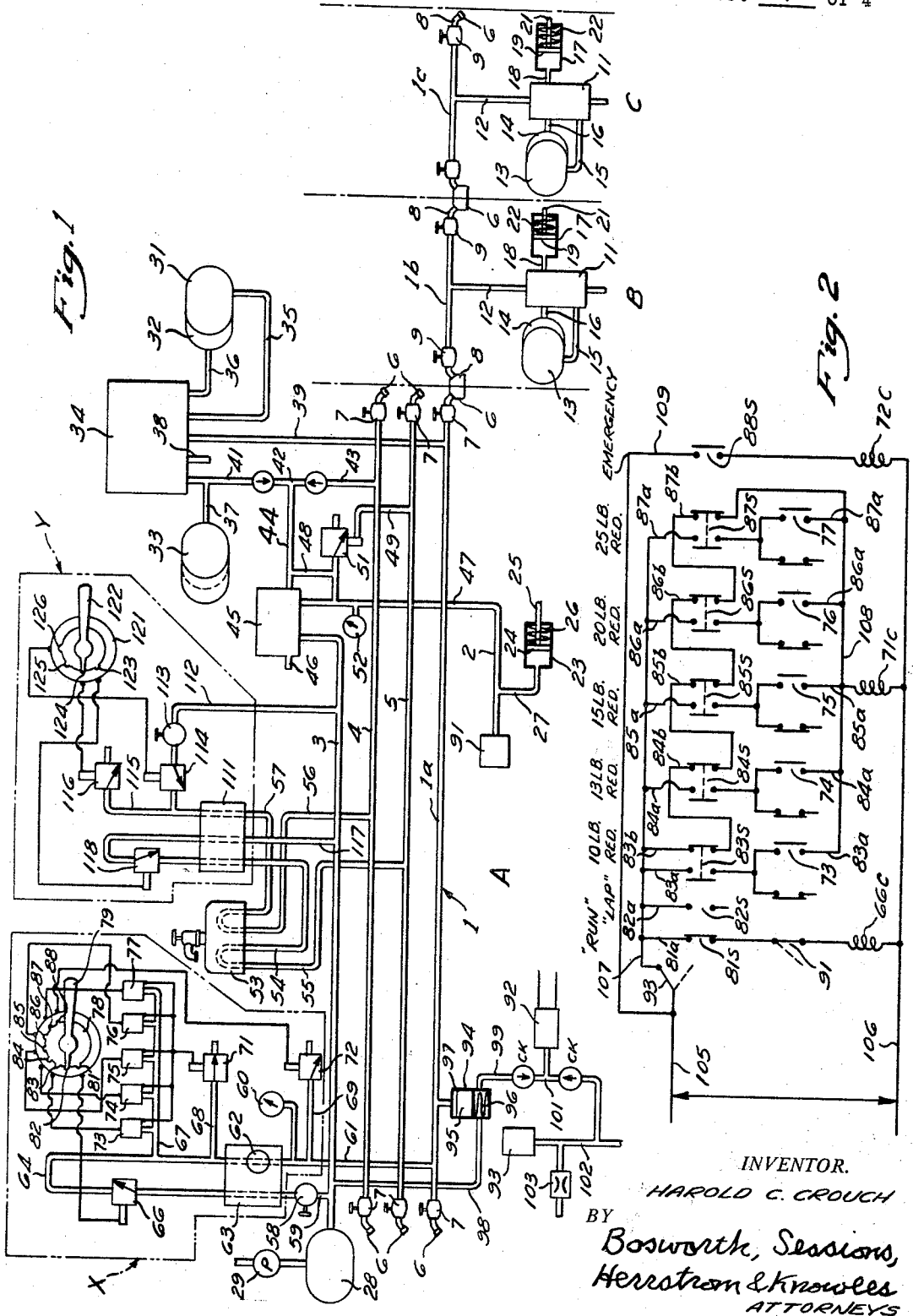

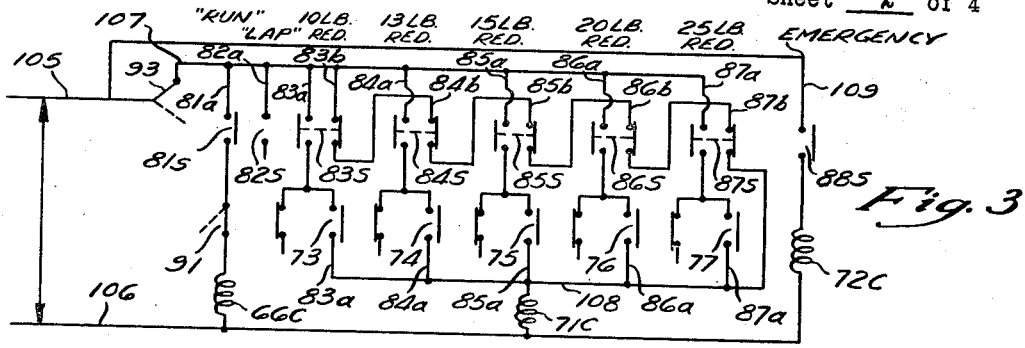
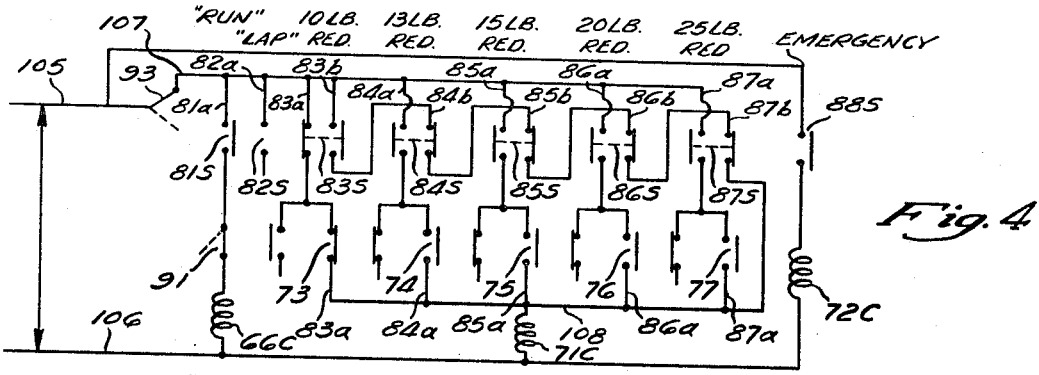
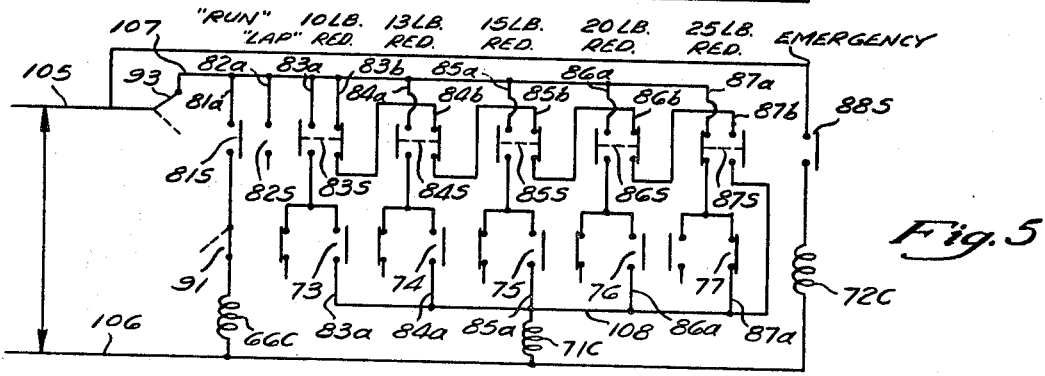
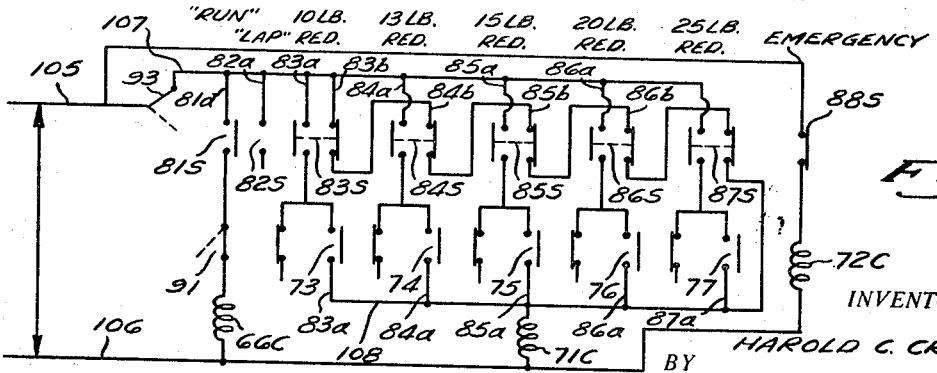

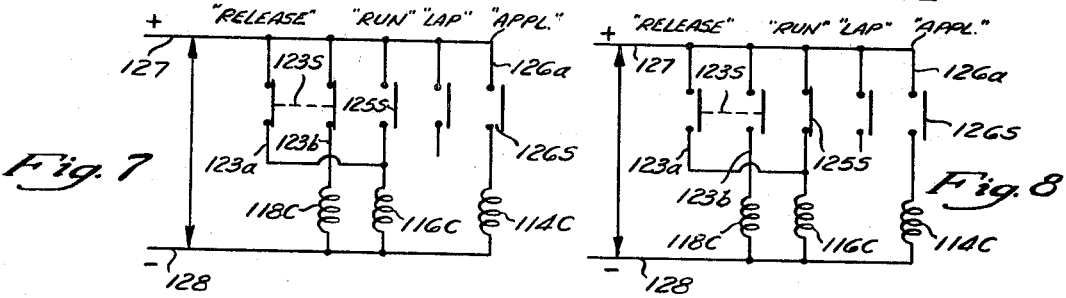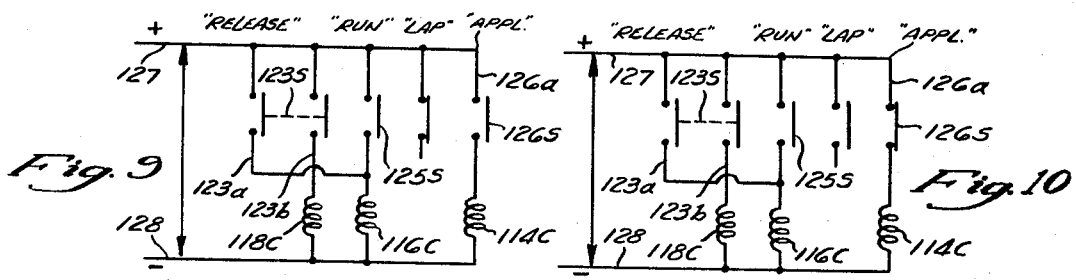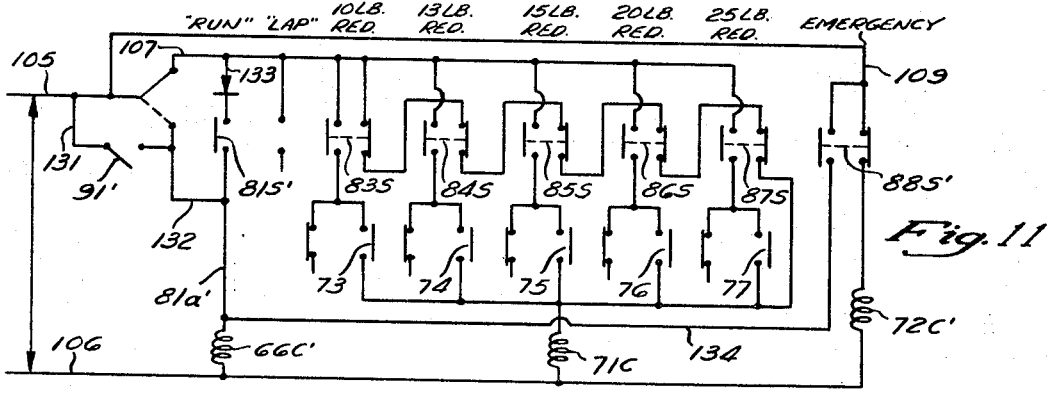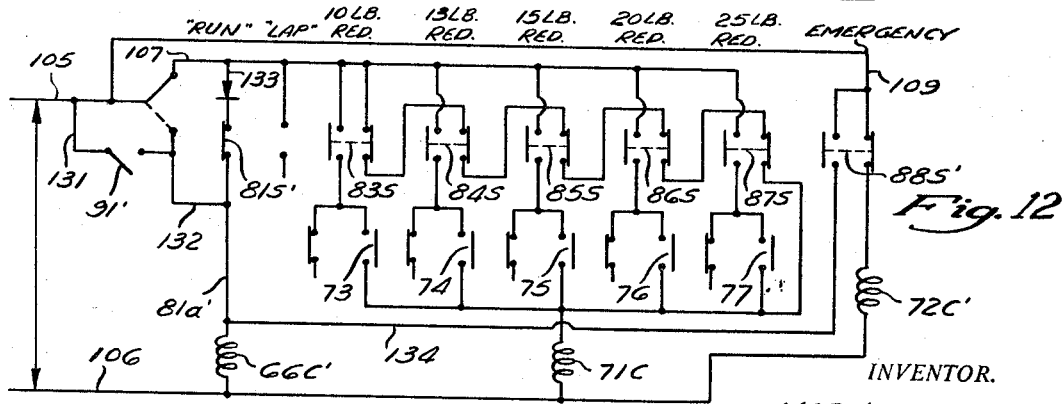

United States Patent Office 3,432,210
Patented Mar. 11, 1969

3,432,210
BRAKING SYSTEM
Harold C. Crouch, Cleveland, Ohio, assignor to Cleveland Technical Center, Inc., Cleveland, Ohio, a corporation of Delaware
Filed Oct. 13, 1965, Ser. No. 495,543
U.S. Cl. 303—3        18 Claims
Int. Cl. B60t 13/68, 13/74

ABSTRACT OF THE DISCLOSURE

A brake system applicable to a train of vehicles made up of a traction vehicle and at least one vehicle moved by the traction vehicle, which system has braking means on each moved vehicle that operates to apply brakes in response to reduction in pressure of fluid in a brake pipe that extends from the traction vehicle to each moved vehicle, and means, preferably carried by the traction vehicle, for reducing fluid in the brake pipe by any one of several preselected predetermined amounts.

---

The present invention relates to fluid-actuated vehicle braking systems, and more particularly to fluid-actuated braking systems that apply brakes in accordance with a reduction in pressure in brake pipes or the like.

Fluid-actuated braking systems that operate to apply brakes in accordance with a reduction in fluid pressure in a brake pipe are widely used in railway applications, particularly in freight trains. In a conventional freight train braking system for a diesel electric locomotive and a train of freight cars the locomotive portion comprises a manually controlled automatic brake valve; a manually controlled independent brake valve; a control valve; a relay valve, reservoirs such as the main, displacement, auxiliary, emergency and equalizing reservoirs; and an air compressor and filters for supplying air to the brake system. There are several pipes adapted to be connected to like pipes on other locomotives so that several locomotives may be operated as one, and a brake pipe that is connected to connected brake pipe sections on the cars of the train to form a brake pipe that extends through all the cars and has a closed valve at the end of the train.

Each car carries a control valve, usually referred to as the AB control valve, car air reservoir, brake cylinders, braking mechanisms actuated by the brake cylinders to apply braking forces to the car wheels, and piping connecting the AB valve to the brake pipe line, to the reservoir, and to the brake cylinders. The AB valve, which is conventional, operates to sense the pressure in the brake pipe line; if the air in the car reservoir is below a predetermined pressure of the brake pipe system the valve charges air into the car reservoir until the predetermined maximum pressure is reached; if the air in the brake pipe line is below such predetermined pressure, the valve allows air to pass from the car reservoir to the car brake cylinder to exert a braking force that is related to the difference between the reservoir pressure and the reduced brake line pressure, the braking force being greater for lower air brake pipe pressures; on the locomotive, the control valve is adapted to sense air pressure changes in cetrain pipes communicating with such valve, and to actuate the relay valve, a slave type of valve, that admits air to the locomotive brake cylinders from the main reservoir, and exhausts air from the cylinders.

The automatic brake valve has a brake handle that can be manually rotated to several angular positions, these usually being "Release," "Running," "Lap," "Service," and "Emergency" positions. This valve handle is normally carried in "Running" position, which keeps the brakes on the locomotive and cars released. In this position, air at a predetermined pressure, usually 80 pounds per square inch gauge (p.s.i.g.) charges the equalizing, auxiliary and emergency reservoirs and the brake pipe system on the locomotive, and the brake pipe sections and the reservoirs on the cars if required. When the handle is moved out of this position, the 80 p.s.i.g. air supply is cut off.

When brakes on the locomotive and cars are to be applied, the valve handle is to be moved to "Service" position which cuts off the 80 p.s.i.g. air supply and permits venting of air from the equalizing reservoir until air pressure in the reservoir and its associated brake pipe is reduced to some selected value which the engineer may determine by watching the equalizing reservoir pressure gauge, the amount of pressure reduction depending on the time the handle is left in service position. Reduction of brake pipe pressure causes the relay valve to discharge air from the locomotive air reservoir to the locomotive brake cylinders, thus causing an application of the locomotive brakes. On the attached cars, this brake pipe reduction is also sensed by the AB control valves which allow air to pass from the car reservoirs to the car brake cylinders to cause them to exert braking forces related to the reduction in brake pipe pressure. When the air pressure is reduced to the value that the engineer desires, he then moves the brake handle to the "Lap" position, which halts venting of air but does not allow the equalizing reservoir pressure or brake pipe pressure to increase. The desired reduced brake pipe pressure, less any leakage, is therefore maintained so long as the handle is in the "Lap" position.

When the engineer desires to release the brakes, he moves the automatic brake valve handle to "Running" position, which reconnects the equalizing reservoir and the brake pipe to the 80 p.s.i.g. air supply. When the brake pipe pressure increases, the control valve on the locomotive sends a release signal to the relay valve, which vents the locomotive brake cylinders and releases the brakeshoe grip on the locomotive wheels. The AB control valves on the attached cars also respond to the increase in brake pipe pressure and vent the brake cylinders to exhaust, thus releasing the brakeshoe grip on the car wheels. Simultaneously, the air lost in the various reservoirs due to application of the brakes is restored for the next brake application.

When the brake pipe pressure is suddenly reduced to zero, as because of a break in the brake pipe, the control valve on the locomotive sends an air signal to the relay valve and the locomotive brake cylinder pressure is increased immediately. On the cars the AB valves detect complete loss of pressure in the brake pipe and operate to pass air from the car reservoirs to the car brake cylinders. The maximum pressure of the various reservoirs is thus applied to the braking cylinders to develop maximum braking effort.

The independent brake valve on the locomotive also has an operating handle that operates to apply or release the locomotive brakes. It is used when only the locomotive is being moved, or when locomotive is being moved with cars attached but no air coupled up. This valve sends an air signal to the locomotive control valve through an independent application and release pipe which is trainlined through any other locomotives used so that all locomotive brakes can be operated independently of the car brakes. The independent brake valve can also be operated to send a signal through an actuating pipe to the control valve to release the locomotive brakes regardless of any other signal that might have been received.

It is thus apparent that in conventional practice the engineer preselects the degree of brake application by venting air from the equalizing reservoir for a time sufficient to cause the pressure to drop to the pressure which will give the braking effect the engineer desires. This requires considerable skill and judgment. If the engineer misjudges so that the brake pipe pressure is not reduced by the proper amount, then the desired braking effect is not achieved and a more intensive or even emergency application of brakes may be required, with consequent undesirable stress on the equipment or wear on wheels or rails. If, on the other hand, he misjudges and causes a brake pipe pressure reduction below that which is appropriate, then the braking application may be too sudden with consequent undesired stress or wear on equipment or rails, or power application may be required to move the train to the desired ultimate position with attendant waste of fuel and time.

Conventional manually controlled valves, and particularly the conventional automatic brake valves, are complicated pieces of equipment which for safety purposes, must be frequently periodically disassembled for inspection, cleaning and repair if necessary. This is an expensive and time-consuming process that usually requires that a locomotive be taken out of service for an undesirably long period of time.

It is an object of this invention to provide a braking system overcoming these disadvantages.

A further object is the provision of a braking system actuated by a reduction of pressure in a brake pipe in which the conventional automatic brake valve is replaced by manually actuated control means that automatically causes a preselected reduction in the brake pipe line when the control is manually actuated to provide such a reduction, without the necessity for personal judgment or adjustment.

Another object is the provision of such apparatus which is simple in construction, rugged and reducing maintenance problems.

Another object is the provision of such apparatus which may be readily disassembled and then reassembled for inspection, cleaning, adjustment or repair, if necessary.

A further object is the provision of such apparatus which is electrically actuated.

Another object of the invention is to provide an independent brake valve controlling means which has the advantages of simplicity, reduction of maintenance problems and requirements and which may be readily disassembled and assembled.

These and other objects of the invention will become apparent from the following description of two embodiments of brake systems embodying the invention, as applied to railway freight service.

FIGURE 1 diagrammatically shows a preferred air-actuated braking system embodying the invention for a locomotive and two cars;

FIGURE 2 is a wiring diagram for a preferred form of manually actuatable apparatus for controlling both the locomotive and car brakes that embodies the invention and may be used in the system of FIGURE 1, showing the circuit arrangement when the manual control is set in the "Run" position;

FIGURE 3 is the diagram of FIGURE 2 when the control is set in the "Lap" position;

FIGURE 4 is the diagram of FIGURE 2 when the manual control is set to effect a 10-pound reduction in brake pipe air pressure;

FIGURE 5 is the diagram of FIGURE 2 when the manual control is set to effect a 25-pound reduction in brake pipe air pressure;

FIGURE 6 is the wiring diagram of FIGURE 2 when the controls are set to release all air pressure in the brake pipe to effect "Emergency" application of the brakes of the locomotive and cars;

Figure 13:
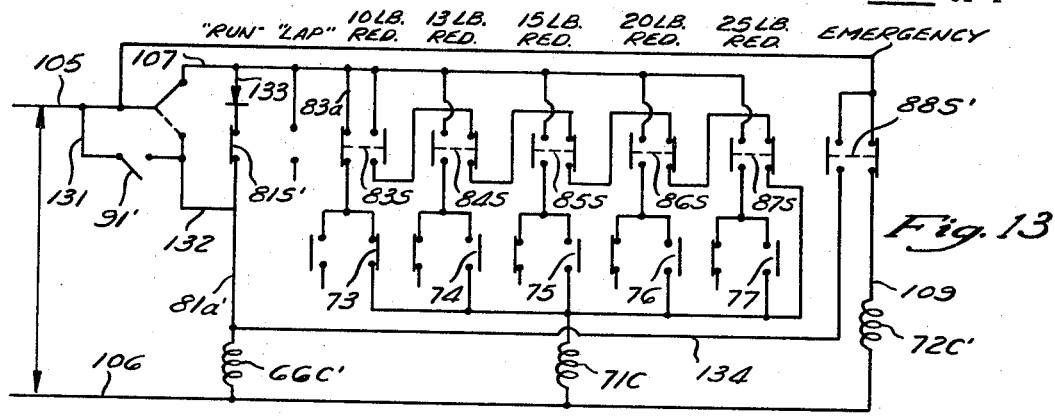
Figure 14:
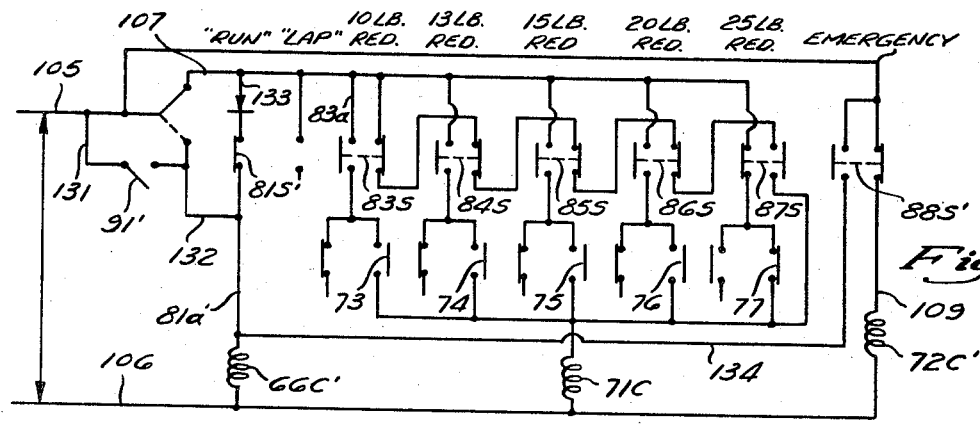
Figure 15:
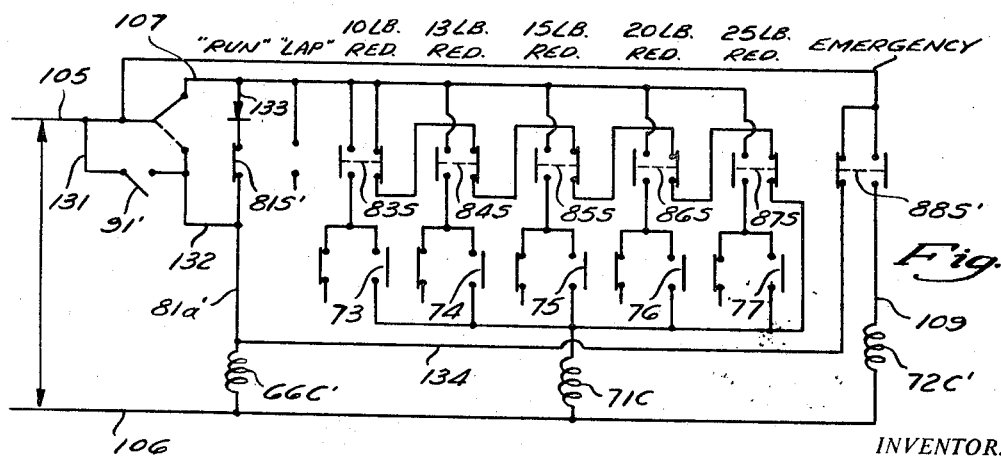

FIGURES 7 to 10, inclusive, show the electrical wiring diagram and the circuit arrangements of a control apparatus for controlling the brakes of the locomotive alone that embodies the invention and may be used in the system of FIGURE 1, when the manual control is set respectively in the "Release," "Run," "Lap" and "Application" positions;

FIGURE 11 is a wiring diagram for another form of manually actuatable apparatus for controlling both the locomotive and car brakes that embodies the invention and may be used in the system of FIGURE 1, shown when the control is set in the "Run" position;

FIGURE 12 shows the diagram of FIGURE 11 and the circuit arrangement thereof when the control is set in the "Lap" position;

FIGURE 13 shows the diagram of FIGURE 11 and the circuit arrangement when the control is set to effect a 10-pound reduction in brake pipe pressure;

FIGURE 14 shows the same diagram and the circuit arrangement when the control is set to effect a 25-pound reduction in brake pipe pressure; and FIGURE 15 shows the same diagram and the circuit arrangement therein when the control is set to effect an emergency application of car and locomotive brakes.

In the brake system of FIGURE 1, section A designates the locomotive, while the sections B and C designate two cars of a train of cars. Only a single locomotive A is shown, but more than one locomotive could be used, each additional locomotive having either a conventional brake system or one embodying the invention.

FIGURE 1 shows a brake pipe 1 of conventional construction, made up of a section 1a of the locomotive and sections 1b and 1c on the cars.

The locomotive also has a brake cylinder pipe 2 for the locomotive brake cylinders, a main reservoir pipe 3, an independent application and release pipe 4, and an actuating pipe 5, all conventional on the locomotive. The brake pipe section 1a, the independent application and release pipe 4, and the actuating pipe 5 have conventional connectors 6 including shut-off cock 7. The pipes 4 and 5 can thus be connected to corresponding pipes on other locomotives, and the brake pipe section 1a of the locomotive can thus be connected to connectors 8, including cocks 9 of the brake pipe sections 1b and 1c of cars B and C. The unconnected cocks 7 on the locomotive, and the unconnected cock 9 on the last car are closed to prevent air loss.

Each car B and C has conventional braking apparatus comprising a brake control valve 11 connected to the brake pipe 1 by a branch pipe 12. Valve 11 may be a conventional AB valve such as that described in Instruction Pamphlet No. 5062 entitled "AB Freight Brake Equipment" published by the Westinghouse Air Brake Company as revised in June 1958. Each car also carries auxiliary and emergency reservoirs 13 and 14 respectively connected to valve 11 by pipes 15 and 16. Conventional brake cylinders 17 are connected to valves 11 through pipes 18.

When the pressure in the brake pipe 1 is reduced below the air pressure in reservoir 13 or 14, control valve 11 opens to admit air from the reservoir into the brake cylinder 17, thus causing the piston 19 to move its piston rod 21, against biasing spring 22, to brake-actuating position. The valve 11 also operates to permit air from brake pipe 1 to recharge the reservoirs 13 and 14 upon the release of the brakes as previously described. The present invention requires no changes in the braking system on the cars.

On the locomotive, cylinder 23 is representative of the locomotive brake cylinders. It has a piston 24 connected to a brake-actuating piston rod 25 and movable under air pressure against the force exerted by biasing spring 26; branch pipe 27 connects the cylinder to pipe 2. The locomotive also has a conventional main reservoir 28 supplied with air under desired pressure by pump 29, conventional emergency and auxiliary reservoirs 31 and 32 and conventional displacement reservoir 33. Reservoirs 31, 32 and 33 are conventionally connected to a conventional AB-1B control valve 34 through pipes 35, 36 and 37. Control valve 34, which has a vent 38, communicates with brake pipe 1 through pipe 39, and also is connected by pipe 41 to pipe 37 and to one side of double check valve 42, the other side of which is connected by pipe 43 to independent application and release pipe 4. The central portion of valve 42 is connected by pipe 44 to conventional B–3 relay valve 45.

Relay valve 45, which has a vent 46, is connected to reservoir 28 by main reservoir pipe 3 and to locomotive brake cylinder pipe 2 by pipe 47. Pipe 44 is connected by pipe 48 to a conventional normally closed independent brake release valve 51. Valve 51 is also connected by pipe 49 to actuating pipe 5. Valve 51 and its connecting pipes are such that pipe 48 vents to atmosphere when actuating pipe 5 is pressurized. Brake cylinder gauge 52 at line 47 indicates the locomotive brake cylinder pressure.

The illustrated system also includes a conventional rotair valve 53 which is a multiposition rotary valve that is manually set in a position according to the type of service in which the locomotive is used—freight or passenger—and also the position of the locomotive in a set of locomotives. If the locomotive is in a position other than leading, the valve is placed in "Lap" position, which cuts off all functions of the independent brake valve. In a leading locomotive, rotair valve 53 is adapted to connect a pipe 54 communicating with the independent brake valve assembly generally indicated by Y, to pipe 55 connected to actuating pipe 5. It is also adapted to connect pipe 56, communicating with independent application and release pipe 4, to pipe 57 connected to assembly Y.

Conventional feed valve 58, in pipe 59 between main reservoir pipe 3 and the locomotive and car brake control assembly X, controls air flow and reduces to a predetermined pressure, preferably about 80 p.s.i.g., the high pressure main reservoir air, usually at 130–140 p.s.i.g., supplied by pipe 3. Conventional brake pipe gauge 60 is connected to pipe 61 between assembly X and the brake pipe 1 to indicate brake pipe pressure, and a conventional double heading cock 62, is open when the locomotive is in leading position and is closed to cut off the brake pipe air supply when the locomotive is in any other position, is shown in part 63 which, in the illustrated embodiment, is the base portion only of a conventional automatic brake valve.

The locomotive and car brake control assembly X comprises a pipe 64 connected to supply pipe 59 through valve 58 to branch pipe 61 connected to brake pipe 1 through cock 62. Pipe 61 has a solenoid controlled valve 66. In the air flow path between the reservoir and the brake pipe after the valve 66, pipe 64 has a branch pipe 67 followed by branch pipe 68 which has a solenoid controlled vent valve 71, while pipe 61 following the gauge 60 has a branch pipe 69 having a solenoid controlled vent valve 72. In FIGURE 1 valve 66 is shown as normally closed, vent valve 71 is shown as normally open, and vent valve 72 is shown as a normally closed valve.

Branch pipe 67 carries a plurality, five in this case, of pressure-controlled electric switches 73, 74, 75, 76 and 77. These switches may be of conventional type, such as those sold by Square–D Manufacturing Co. of Asheville, N.C., as "Square–D Type ACW 5, Class 9012" switches, which are designed to operate so that on the reduction of pressure the switch will close after the pressure has fallen a predetermined amount. This type of switch is adjustable to adjust the pressure differential between the initial predetermined pressure and a lower pressure at which the switch will close on falling pressure.

These switches are electrically connected to a suitable manually operated electrical switch 78 that will provide the desired contact arrangements. One type of suitable conventional switch is the "Rotary Switch Type C25" manufactured by American Solenoid Co., Inc. of Rahway, N.J. The switch 78 illustrated in assembly X is shown as having an actuating handle 79 adapted to be turned to eight switching positions, 81 to 88, inclusive.

The system of FIGURE 1 also includes a pressure-actuated electrical switch 91 connected to the locomotive brake cylinder pipe and adapted to be actuated by an abnormal rise in pressure, as occurs on emergency brake application, to close off the brake pipe air supply. The system also includes means for actuating a locomotive power cut-off switch 92 in the event of an abnormal drop in pressure in the brake pipe, and means for actuating a pressure switch 93 to effect a safety control brake application in the event of a failure to obey signals.

In FIGURE 1, this portion of the system comprises a switch 94 having a piston 95 that is biased by spring 96 toward the end of the cylinder 97 that communicates with brake pipe 1. A pipe 98 connects the cylinder 97 with the main reservoir pipe 3; a pipe 99 connects the cylinder to one side of a double check valve 101. The switch 94 is designed so that if the brake pipe pressure is abnormally low, as less than about 30 pounds p.s.i.g., the piston exposes the openings of pipes 98 and 99 into the cylinder so that air reservoir pressure passes from pipe 98 into pipe 99; if the brake pipe pressure is in the normal range, or greater than 30 p.s.i.g., the piston 95 closes pipe 99 off from pipe 98. The other side of check valve 101 is connected to a pipe 102 that is connected with pressure valve 93 and also communicates with an electro-pneumatic valve, not shown, forming part of the conventional safety control system of a locomotive. Pipe 102 also has an orifice 103 that permits bleeding off of air from the system made up of pipes 102 and valve 93 after the safety control system has been actuated. The central portion of the check valve opens into the locomotive power cut-off switch 92.

It is apparent that so long as the pressure in the brake pipe 1 is above its lowest normal operating pressure, and as long as the safety control system has not been actuated, the locomotive power cut-off switch 92 is not subjected to air pressure and hence is closed so that it does not cut off locomotive power. If either the brake pipe pressure falls below normal or if the safety control apparatus is actuated, air under substantial pressure is introduced through the check valve 101 to the switch 92, causing it to open and cut off power to the locomotive. If the brake pipe pressure drops below normal operating pressure, as due to a break in two of the train, the switch 91, as will be indicated later, sets the brakes on both the locomotive and the cars. A failure to obey signals, which would cause actuation of the safety control system, will cause the switch 93 to actuate the electrical system and set the brakes by means to be described.

As is apparent from FIGURES 2 to 6, inclusive, the electrical circuit for the portion X of the braking system, which also includes normally closed switches 91 and 93, comprises leads 105 and 106 connected to a suitable source of direct current, not shown, such as a 64-volt battery connected to suitabe charging means. The circuit includes switches 81S, 82S, 83S, 84S, 85S, 86S 87S and 88S, respectively corresponding to the positions 81 to 88, inclusive, of the switch 78 which as indicated above is a commercially available switch that will provide the desired circuit arrangements indicated below. Switches 83S to 87S are double armature switches, each armature of which closes a circuit while the other opens a circuit. Each of these switches 83S to 87S is adapted to be respectively connected in a circuit with the electrical portion of the associated one of the pressure switches 73 to 77, inclusive, which as indicated above respectively provide for reductions of 10, 13, 15, 20 and 25 p.s.i.g. from the initial 80 p.s.i.g. brake pressure in the illustrated embodiment; and also in another circuit that controls the flow of current through solenoid coil 71C.

Lead 105 is connected through pressure switch 93 to branch lead 107. From lead 107 there is a lead 81a adapted to be controlled by switch 81S and also by switch 91, which lead is connected to coil 66C of solenoid valve 66, the other end of which coil is connected to lead 106.

Lead 107 also has a branch lead 82a that is unconnected.

Leads 83a and 83b branch from lead 107 and are adapted to be opened and closed by switches 83S. Lead 84a branching from lead 107, and lead 84b in series with lead 83a are controlled by switch 84S. Lead 85a branching from lead 107 and lead 85b in series with lead 84b are controlled by switch 85S. Similarly, leads 86a and 86b, and leads 87a and 87b are adapted to be opened and closed by switches 86S and 87S. Leads 83a, 84a, 85a, 86a and 87a are connected in parallel to a lead 108 that is connected to one end of the coil 71C of the normally open solenoid valve 71, the other end of the coil being connected to lead 106; each of these leads forms part of a separate circuit between lead 107 and lead 108 that can be opened or closed by the respective pressure switch 73, 74, 75, 76 or 77.

The circuit also includes a lead 109 branching from lead 105 that is controlled by switch 88S that is connected to one side of the coil 72C of solenoid valve 72, the other side of such coil being connected to lead 106.

It is apparent, therefore, that unless one of the switches 83S to 87S is manually actuated, or unless switch 93 is opened by one of the emergencies mentioned above, there is a circuit through the series-connected leads 83b to 87b, and through lead 108 that energizes solenoid coil 71C and therefore keeps the solenoid valve 71 closed.

Assuming that no emergency conditions has caused either switch 91 or 93 to open, movement of handle 79 of controller switch 78 to the "Run" position completes a circuit between leads 106 and 107 through coil 66C of solenoid 66, FIGURE 2, that opens valve 66 and allows pressurized air from main reservoir 28 to pass through reducing feed vave 58 into the brake pipe 1, and to charge the various other reservoirs to brake pipe pressure if they require charging. Coil 71C is energized to keep normally open solenoid valve 71 closed, while coil 72C is not energized so normally closed valve 72 remains closed. The brakes of the locomotive and cars are therefore released as previously described.

The circuit conditions obtaining when the handle 79 is moved to position 82, or the "Lap" position, are illustrated in FIGURE 3. The circuit 81a is opened by switch 81S, so that normally closed solenoid valve 66 closes, while coil 71C is energized to close valve 71 and the normally closed solenoid valve 72 remains closed. Therefore, no air is charged into or bled from the system by any one of valves 66, 71 or 72, so that the brake pipe pressure remains at the pressure that obtained at the time the handle was moved to the "Lap" position.

FIGURE 4 illustrates the circuit conditions when the handle 79 is moved to position 83 to provide a reduction of 10 pounds in the brake pipe pressure from the 80-pound p.s.i.g. initial pressure. As is apparent from this figure, when the switch 83S is actuated, switch 81S is in its normally open position and all other switches 84S to 88S are in their normal positions, being unaffected by actuation of switch 83S. Therefore, coils 66C and 72C are not energized and valves 66 and 72 are closed so that now air can be admitted to the system from reservoir 28, or bled from valve 72. On initial actuation of switch 83S, however, solenoid valve 71 opens, since the circuit formed by the normally series-connected leads 83b, 84b, 85b, 86b and 87b is opened by movement of the appropriate armature of switch 83S. Air then vents from the brake pipe system through valve 71 until the pressure is reduced sufficiently to reach the setting of the pressure switch 73, which causes its armature to close the circuit through leads 83a and 108 through the coil 71C to close its normally open valve 71. The pressure in the brake pipe line has thus been reduced by 10 p.s.i. and a corresponding application of the brakes of the locomotive and the cars has been effected.

FIGURE 5 shows the circuit conditions when it is desired to reduce brake line pressure by 25 p.s.i., the maximum pressure reduction for normal braking in the illustrated system. When the handle is moved to position 87, switch 87S is moved to the indicated position; switch 81S remains in its normally open position and all of the remaining switches 83S to 86S also remain in their normal positions. Initially, when switch 87S is closed, solenoid valves 66 and 72 remain closed but solenoid valve 71 is opened since the circuit through its coil 71C is opened by switch 87S and not yet restored by pressure switch 77S. Valve 71 therefore vents air from the brake pipe system until its air pressure is reduced by 25 p.s.i. for which switch 77 is set; switch 77 then closes, thus completing a circuit through leads 105, 107, 87a, lead 108 and the coil 71C of valve 71 to lead 106, thus energizing the solenoid and closing valve 71. Braking force corresponding to such reduction in pressure is then applied by the brakes of both the locomotive and the cars in conventional manner.

Reductions of 13 pounds, 15 pounds or 20 pounds from initial brake line pressures of 80 p.s.i.g. can be similarly effected by appropriate movement of the handle 79 of switch 78.

When the control handle 79 of switch 78 is turned to the "Emergency" position, as illustrated in FIGURE 6 switch 88S is closed. All of the other switches 81S to 87S are in their normal positions, so solenoid coil 66C is not energized and valve 66 is closed, and the circuit through coil 71C is energized to close the normally open valve 71. Closing of switch 88S completes a circuit through lead 109 and coil 72C to open normally closed solenoid valve 72 to vent air from the brake pipe 1 sufficiently rapidly to permit an emergency application of the brakes on both the locomotive and the cars.

Of course, the 80 p.s.i.g. or other predetermined pressure in the brake line can be restored by moving the handle to the "Run" position to effect the circuit arrangement described with FIGURE 2 and cause air to be charged from the locomotive main reservoir into the brake pipe and the reservoirs of the cars.

The system illustrated in FIGURE 1 also includes, according to the invention, an independent brake valve assembly, designated with the broken lines Y, that controls the brakes of the locomotive alone when no cars are connected to it or when the cars are connected but the car brake pipes do not communicate with the locomotive brake pipe. This assembly can also control several locomotive units through the locomotive train lines as described below.

The assembly includes a unit 111 that constitutes the base portion only of the conventional independent brake unit. A pipe 112 connected to main reservoir pipe 3 communicates through a reducing valve 113 and a normally closed solenoid controlled valve 114 with a pipe 115 that is connected with pipe 57 that in turn is connected by rotair valve 53 with pipe 56 communicating with the conventional independent application and release pipe 4. This pipe is connected to corresponding pipes on attached locomotives as well as those of the leading locomotive. Pipe 115 also has a normally closed solenoid controlled valve 116 that is adapted to vent to the atmosphere when open.

Also connected to the main reservoir pipe 3 is another pipe 117 communicating through a normally closed solenoid controlled valve 118 with pipe 54 that is adapted to be connected through rotair valve 53 with pipe 55 communicating with conventional actuating pipe 5 that can also be connected to other locomotives.

A manually controlled electrical control switch 121, having an operating handle 122, is adapted to be adjusted to four positions 123, 124, 125 and 126, respectively corresponding to the "Release," "Run," "Lap," and "Application" positions. Valve 122 may be a conventional valve similar to valve 78 with appropriate switching arrangements to be described later.

In this system, the reducing valve 113 preferably is set to provide a maximum locomotive brake cylinder pressure of 45 p.s.i.g. when the main reservoir pressure is 140 p.s.i.g.

The circuit, and the various circuit arrangements for the various positions of the handle are illustrated by FIGURES 7 to 10, inclusive. As is apparent from these figures, the leads 127 and 128 are connected to a suitable source of direct current, as a 64-volt storage battery having suitable charging means. The coils of the solenoids for normally closed solenoid valves 114, 116 and 118 are respectively indicated as 114C, 116C and 118C.

As is apparent from FIGURE 7, when the handle 122 is moved to a "Release" position, the double armature switch 123S completes the circuits through leads 123a and 123b, respectively connected to one side of each of coils 116C and 118C, the other sides of which are connected to lead 127, energizing the solenoids for and opening valves 116 and 118, thus permitting air to pass from main reservoir pipe 3 through pipe 117 through rotair valve 53 and pipe 55 to the actuating pipe 5. When this pipe is pressurized, the normally closed pressure-actuated valve 51 opens to permit air from pipe 48 to pass to atmosphere, which releases the locomotive brakes in the usual manner. Any attached locomotive units will also have their brakes released. Opening of valve 116 also permits venting of any air trapped in the independent application and release pipe.

When the handle 122 is turned to the "Run" position (FIGURE 8) the switch 123S is open and the switch 125S is closed, thus energizing the solenoid coil 116C of valve 116 to open it and vent the application and release pipe; the other two valves 114 and 116 remain closed.

When the handle 122 is moved to the "Lap" position shown in FIGURE 9, the circuits through all three solenoids are open and the valves 114, 116 and 118 remain closed so that preexisting conditions are maintained in the brake line.

When the handle 122 is turned to the "Application" position, as shown in FIGURE 10, the switches 123S and 125S are opened whereas the switch 126S is closed to complete a circuit through lead 126a between lead 127 and lead 128 through coil 114C of the solenoid for valve 114. This opens valve 114 and permits air to flow from pipes 3 and 112 through reducing valve 113 at the indicated reduced pressure through pipes 115, 57 and 56 through the rotair valve 53 to the independent application and release pipe 4, from which it can pass through pipe 43 and check valve 42 to the relay valve 45 which responds and provides air to the locomotive brake cylinders.

The brakes can be released as indicated above.

FIGURES 11 to 15, inclusive, illustrate a circuit, and various circuit arrangements for "Run", "Lap", 10-pound reduction, 25-pound reduction and "Emergency" condition of a modified brake system embodying the invention. In this modification, the fluid system can be identical to that of FIGURE 1 except that solenoid controlled valves 66 and 72 are both normally open valves rather than normally closed valves as in the previous embodiment, and except that the pressure-actuated switch 91, instead of being of the type that is closed when adequate brake pipe pressure is maintained and opens when such pressure drops, is of the type that remains open when adequate brake pipe pressure is maintained and closes when such pressure drops. All three solenoid controlled valves, thus are of the normally open type.

These modifications are reflected in the wiring diagrams of FIGURES 11–15, inclusive, in which the solenoid coil for valve 66 is indicated as 66C' and the coil for valve 72 is indicated as 72C', and the pressure-actuated switch is designated 91'; the coil for valve 71 retains the reference numeral 71C since the valve is unchanged. These diagrams, therefore, differ in some respects from those of FIGURES 2–6, inclusive.

Supply leads 105 and 106 are connected to a similar source of direct current. A circuit 131 branching from lead 105 and connected to a circuit 132, is closed by switch 91' when it is actuated.

Branch lead 81a' connected to the side of solenoid coil 66C' opposite the side connected to lead 106 is adapted to be closed by switch 81S' as described later, and also is connected to lead 107 through a diode 133 that prevents reverse flow of current through completed lead 81a'.

This circuit also includes a lead 134, branching from lead 109, that is connected to power supply lead 105 and also connected to the side of coil 66C' opposite that connected to lead 106. Switch 88S' is a double armature switch that controls leads 109 and 134, closing one when the other is open. The remainder of the circuit is the same as that of FIGURES 2–6, inclusive.

In operation of the modification illustrated by FIGURES 11–15, inclusive, when the controller handle 79 of switch 78 is turned to the "Run" position, the circuit arrangement is that shown in FIGURE 11, in which switches 81S', and 88S' are positioned so the circuits controlling coil 66C' are not complete and its normally open valve therefore remains open. Double armature switches 83S' to 88S' also complete the circuits through coils 71C and 72C' so their normally open valves are closed. The conditions are then as described above in connection with the preceding embodiment in connection with the "Run" position.

When the handle 79 is moved to the "Lap" position (FIGURE 12), the switch 81S closes the lead 81a and thus energizes the coil 66C' to close its valve, while opening the circuit controlling coil 71C so its valve is open. Switch 88S' also closes lead 109 to energize coil 72C' so its valve is closed. Therefore, whatever pressure is in the brake line system is maintained, as in the previous embodiment.

FIGURE 13 illustrates the condition when a 10-pound reduction in brake pipe pressure is effected. In this position, the circuit 81a is completed and coil 66C' is energized to close its normally open valve, and the circuit through coil 72C' is closed and the coil energized to close its normally open valve. Furthermore, the switch 83S closes the circuit 83a. The resultant activity is the same as that described in the previous embodiment to effect a reduction in the pressure in the brake line which ceases when the switch 73, which is set for a 10-pound reduction, closes and completes a circuit through coil 71C to close its valve 71 and halt its venting to the atmosphere.

FIGURE 14 shows the circuit arrangement to effect a 25-pound reduction in brake pipe pressure. The valve settings are similar to those for FIGURE 13 except that circuit 87a is closed by switch 87S while circuit 83a is opened by switch 83S, pressure switch 77 closing after the desired pressure reduction has been achieved to energize coil 71C and close the venting valve 71.

FIGURE 15 shows the conditions that obtain when the handle is set to an "Emergency" application. In such case the double armature switch 88S' opens the circuit 109 so that the coil 72C' is not energized so its normally open valve remains open, while the switch 88S' also completes circuit 134 to energize coil 66C' to close the valve 66. Coil 71C, being energized, keeps valve 91 closed. The valves are then in the same condition as previously described in connection with FIGURE 6 and the operation of the system is the same to effect an emergency application of the brakes.

It is apparent that the present invention provides a braking system which is virtually fool-proof in providing precise desired predetermined reductions in brake line pressure, and in making possible proper applications of brakes of locomotives and attached cars, as well as locomotives alone.

The control portions of the system are much simpler than those conventionally used and less likely to get out of order. Moreover, conventional systems require an equalizing reservoir that is connected to one side of a piston valve the other side of which communicates with the brake pipe, and the equalizing reservoir pressure is reduced. In the present system the brake pipe pressure is directly reduced, so no equalizing reservoir or complicated valve is required; this also reduces possibilities of malfunction in the system. Because of their simplicity, the improved portions of the braking system of the invention can be much more readily and rapidly disassembled for inspection, cleaning or repair, and reassembled, with consequent saving in labor costs and locomotive down time.

The disclosed means for effecting control of the brakes of a locomotive and attached cars may be used with conventional independent locomotive brake application means rather than that illustrated, and also the disclosed independent locomotive brake application means may be used with conventional means for controlling the application of the brakes of both the locomotives and the cars, although major advantages are achieved when both novel means are used. Moreover, a locomotive equipped with a brake system embodying the invention may be used either in a leading or following position with conventionally equipped locomotives, and when used as a leading locomotive with conventionally equipped following locomotives it can provide the above indicated operating advantages to all locomotives.

It is apparent that various modifications other than those indicated may be made in the apparatus and method described herein without departing from the spirit of the invention.

What is claimed is:

1. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe by a predetermined amount, said means comprising solenoid controlled valve means having coil means adapted to control the operation of said valve means, said valve means communicating with said brake pipe so that when said valve means is open it vents fluid to reduce fluid pressure in said brake pipe, electrical circuit means adapted to connect said coil means to a source of electrical energy, actuatable switch means associated with said circuit means for controlling application of electrical energy to said coil means to cause said valve means to open and vent fluid to reduce fluid pressure in said brake pipe, and pressure switch means responsive to pressure in said brake pipe and associated with said circuit means for controlling application of electrical energy to said coil means to cause said valve means to close and halt venting of fluid after the pressure in said brake pipe has been reduced a predetermined amount.

2. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe to a different predetermined pressure, said means comprising solenoid controlled valve means having coil means adapted to control the operation of said valve means, said valve means communicating with said brake pipe so that when said valve means is open it vents fluid to reduce fluid pressure in said brake pipe, electrical circuit means adapted to connect said coil means to a source of electrical energy, actuatable switch means associated with said circuit means for controlling application of electrical energy to said coil means to cause said valve means to open and vent fluid to reduce fluid pressure in said brake pipe, and pressure switch means responsive to pressure in said brake pipe and associated with said circuit means for controlling application of electrical energy to said coil means to cause said valve means to close and halt venting of fluid after the pressure in said brake pipe has been reduced to said different predetermined pressure.

3. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe by any one of several different preselected predetermined amounts, said means comprising solenoid controlled valve means having coil means communicating with said brake pipe so that when said valve means is open it vents fluid to reduce fluid pressure in said brake pipe, electrical circuit means adapted to connect said coil means to a source of electrical energy, actuatable switch means associated with said circuit means for controlling application of electrical energy to said coil means to cause said valve means to open and vent fluid to reduce fluid pressure in said brake pipe, and pressure switch means responsive to pressure in said brake pipe and associated with said circuit means for controlling application of electrical energy to said coil means to cause said valve means to close and halt venting of fluid after the pressure in said brake pipe has been reduced by one of said preselected predetermined amounts.

4. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe to any one of several different preselected predetermined pressures, said means comprising solenoid controlled valve means having coil means adapted to control the operation of said valve means, said valve means communicating with said brake pipe so that when said valve means is open it vents fluid from said brake pipe to reduce fluid pressure in said brake pipe, electrical circuit means adapted to connect said coil means to a source of electrical energy, actuatable switch means associated with said circuit means for controlling application of electrical energy to said coil means to cause said valve means to open and vent fluid to reduce fluid pressure in said brake pipe, and pressure switch means responsive to pressure in said brake pipe and associated with said circuit means for controlling application of electrical energy to said coil means to cause said valve means to close and halt venting of fluid after the pressure in said brake pipe has been reduced to one of said different preselected predetermined pressures.

5. In a brake system of the type having braking means operative to effect application of brakes responsive ot a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe by a predetermined amount, said means comprising normally open solenoid controlled valve means having coil means that when energized closes said valve means, said valve means communicating with said brake pipe so when said valve means is open it vents fluid to reduce fluid pressure in said brake pipe, electrical circuit means adapted to connect said coil means to a source of electrical energy; actuatable switch means associated with said circuit means for opening said circuit means to said coil means to cause said normally open valve means to open and vent fluid to reduce fluid pressure in said brake pipe, and pressure switch means responsive to pressure in said brake pipe and associated with said circuit means for closing said circuit means to energize said coil means to close said valve means and halt venting after the pressure in said brake pipe has been reduced a predetermined amount.

6. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe to a different predetermined pressure, said means comprising normally open solenoid controlled valve means having coil means that when energized closes said valve means, said valve means communicating with said brake pipe so when said valve means is open it vents fluid to reduce fluid pressure in said brake pipe, electrical circuit means adapted to connect said coil means to a source of electrical energy, actuatable switch means associated with said circuit means for opening said circuit means to said coil means to cause said normally open valve means to open and vent fluid to reduce fluid pressure in said brake pipe by venting fluid; and pressure switch means responsive to pressure in said brake line and associated with said circuit means for closing said circuit means to energize said coil means to close said valve means and halt venting after the pressure in said brake pipe has been reduced to said different predetermined pressure.

7. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to a reduction in pressure of fluid in said brake pipe; and means for reducing fluid pressure in said brake pipe by any one of several different preselected predetermined amounts, said means comprising normally open solenoid controlled valve means having coil means that when energized closes said valve means, said valve means communicating with said brake pipe so when said valve means is open it vents fluid to reduce fluid pressure in said brake pipe, electrical circuit means adapted to connect said coil means to a source of electrical energy, actuatable switch means associated with said circuit means for opening said circuit means to said coil means to cause said normally open valve means to open and vent fluid to reduce fluid pressure in said brake pipe, and pressure switch means responsive to pressure in said brake pipe and associated with said circuit means for closing said circuit means to energize said coil means to close said valve means and halt venting after the pressure in said brake pipe has been reduced by one of said preselected predetermined amounts.

8. In a brake system of the type having braking means operative to effect application of brakes responsive to a reduction of pressure of fluid in a brake pipe, the combination of a brake pipe, means for establishing a predetermined pressure of fluid in said brake pipe; braking means adapted to apply brakes in response to a reduction in pressure of fluid in said brake pipe; and means for reducing fluid pressure in said brake pipe to any one of several different preselected predetermined pressures, said means comprising normally open solenoid controlled valve means having coil means that when energized closes said valve means, said valve means communicating with said brake pipe so when said valve means is open it vents fluid from said brake pipe to reduce fluid pressure in said brake pipe, electrical circuit means adapted to connect said coil means to a source of electrical energy, actuatable switch means associated with said circuit means for opening said circuit means to said coil means to cause said normally open valve means to open and vent fluid to reduce fluid pressure in said brake pipe, and pressure switch means responsive to pressure in said brake line and associated with said circuit means for closing said circuit means to energize said coil means to close said valve means and halt venting after the pressure in said brake pipe has been reduced to one of said different preselected predetermined pressures.

9. In a brake system having braking means operative to effect application of brakes responsive to a reduction of pressure of fluid in a brake pipe, the combination of a brake pipe; means for establishing a predetermined pressure of fluid in said brake pipe; braking means adapted to apply brakes in response to reduction of pressure of fluid in said brake pipe; and means for reducing fluid pressure in said brake pipe by a predetermined amount, said means comprising vent valve means communicating with said brake pipe so that when said valve means is open it vents fluid to reduce fluid pressure in said brake pipe and when closed it halts venting of said fluid, actuatable means that when actuated is responsive to pressure in said brake pipe reduced by said predetermined amount and operatively associated with said valve means to cause said valve means to close and halt venting of fluid after the pressure in said brake pipe has been reduced a predetermined amount and actuatable means that when actuated causes said vent valve means to open and vent fluid to reduce fluid pressure in said brake pipe and also actuates said pressure responsive means to cause it to be responsive to pressure in said brake pipe.

10. The brake system of claim 9 in which said means for reducing fluid pressure in said brake pipe by a predetermined amount operates to reduce fluid pressure in said brake pipe by any one of several different preselected predetermined amounts, and comprises actuatable pressure responsive means that when actuated by said actuatable means is responsive to the pressure in said brake pipe after it has been reduced by any one of said preselected predetermined amounts, to cause said vent valve means to close and halt venting of fluid.

11. In a brake system of the type having braking means operative to effect application of brakes responsive to a reduction of pressure of fluid in a brake pipe, the combination of a brake pipe; means for establishing a predetermined pressure of fluid in said brake pipe; braking means adapted to apply brakes in response to reduction in pressure of fluid in said brake pipe; and means for reducing fluid pressure in said brake pipe to another predetermined pressure comprising vent valve means communicating with said brake pipe so that when said valve means is open it vents fluid to reduce fluid pressure in said brake pipe and when closed it halts venting of such fluid, actuatable means that when actuated is responsive to said other predetermined reduced pressure in said brake pipe and operatively associated with said valve means to cause said valve means to close and halt venting of fluid after the fluid pressure in said brake pipe has been reduced to said other predetermined pressure, and actuatable means that when actuated causes said vent valve means to open and vent fluid to reduce fluid pressure in said brake pipe and also actuates said pressure responsive means to cause it to be responsive to said other predetermined pressure in said brake pipe to close said vent valve means.

12. The brake system of claim 11 in which said means for reducing fluid pressure in said brake pipe to another predetermined pressure operates to reduce fluid pressure in said brake pipe to any one of several different preselected predetermined pressures, and comprises actuatable pressure responsive means that when actuated by said actuatable means is responsive to the pressure in said brake pipe after it has been reduced to one of said different preselected predetermined pressures, to cause said vent valve means to close and halt venting of fluid.

13. In a brake system for a train of vehicles comprising a traction vehicle and at least one vehicle movable by said traction vehicle, said brake system being of the type having braking means carried by each movable vehicle operative to effect application of brakes responsive to reduction of pressure of fluid in a brake pipe, the combination of a brake pipe extending from said traction vehicle to each movable vehicle; means on said traction vehicle for establishing a predetermined pressure of fluid in said brake pipe; braking means on each movable vehicle adapted to apply brakes in response to reduction in pressure of fluid in said brake pipe; and means carried by said traction vehicle for reducing fluid pressure in said brake pipe by a predetermined amount, comprising vent valve means communicating with said brake pipe, so that when said valve means is open it vents fluid to reduce fluid pressure in said brake pipe and when closed it halts venting of such fluid, actuatable pressure responsive means that when actuated operates to close said vent valve means after the fluid pressure in said brake pipe is reduced by a predetermined amount, and actuatable means that when actuated causes said vent valve means to open and vent fluid to reduce fluid pressure in said brake pipe and also actuates said pressure responsive means to cause it to be responsive to pressure of fluid in said brake pipe.

14. The brake system of claim 13 in which said means for reducing fluid pressure in said brake pipe by a predetermined amount operates to reduce fluid pressure in said brake pipe by any one of several different preselected predetermined amounts, and comprises actuatable pressure responsive means that when actuated by said actuatable means is responsive to the pressure in said brake pipe after it has been reduced by any one of said preselected predetermined amounts to cause said vent valve means to close and halt venting of fluid.

15. In a brake system for a train of vehicles comprising a traction vehicle and at least one vehicle movable by said traction vehicle, said brake system being of the type having braking means carried by each movable vehicle operative to effect application of brakes responsive to reduction of pressure of fluid in a brake pipe, the combination of a brake pipe extending from said traction vehicle to each of said movable vehicles; means on said traction vehicle for establishing a predetermined pressure of fluid in said brake pipe; braking means on each movable vehicle adapted to apply brakes in response to reduction in pressure of fluid in said brake pipe; and means carried by said traction vehicle for reducing fluid pressure in said brake pipe to another predetermined pressure comprising vent valve means communicating with said brake pipe, so that when said valve means is open it vents fluid to reduce pressure of fluid in said brake pipe and when closed it halts venting of said fluid, actuatable pressure responsive means that when actuated operates to close said vent valve means after the fluid pressure in said brake pipe has ben reduced to said other predetermined pressure, and actuatable means that when actuated causes said vent valve means to open and vent fluid to reduce fluid pressure in said brake pipe and also actuates said pressure responsive means to cause it to be responsive to pressure of fluid in said brake pipe.

16. The brake system of claim 15 in which said means for reducing fluid pressure in said brake pipe by a predetermined amount operates to reduce fluid pressure in said brake pipe to any one of several different preselected predetermined pressures, and comprises actuatable pressure responsive means that when actuated by said actuatable means is responsive to the pressure in said brake pipe after it has been reduced to any one of said preselected predetermined pressures to cause said vent valve means to close and halt venting of fluid.

17. The brake system of claim 9 comprising a plurality of actuatable pressure responsive means each of which when actuated is responsive to pressure of fluid in said brake pipe and is operatively associated with said valve means to cause said valve means to close and halt venting of fluid after the pressure in said brake pipe has been reduced by an amount to which the particular pressure responsive means is responsive, and in which system said actuatable means that when actuated causes said vent valve means to open and vent fluid to reduce fluid pressure in said brake pipe also operates to actuate a preselected one of said pressure responsive means so that it is responsive to a particular pressure reduction in said brake pipe without actuating said other pressure responsive means.

18. The brake system of claim 11 comprising a plurality of actuatable pressure responsive means each of which when actuated is responsive to pressure of fluid in said brake pipe and is operatively associated with said valve means to cause said valve means to close and halt venting of fluid after the pressure in said brake pipe has been reduced to a pressure to which the particular pressure responsive means is responsive, and in which system said actuatable means that when actuated causes said vent valve means to open and vent fluid to reduce fluid pressure in said brake pipe also operates to actuate a preselected one of said pressure responsive means so that it is responsive to a particular reduced pressure in said brake pipe without actuating said other pressure responsive means.

References Cited

UNITED STATES PATENTS

| 2,148,751 | 2/1939 | Hewitt | 303—20 X |
| 2,324,904 | 7/1943 | Canetta et al. | 303—20 |
| 2,897,011 | 7/1959 | Cotter | 303—20 X |
| 2,933,350 | 4/1960 | Hines | 303—3 |
| 2,940,798 | 6/1960 | Weber | 303—28 |
| 2,958,561 | 11/1960 | May | 303—8 |
| 3,118,707 | 1/1964 | Simmons et al. | 303—48 X |
| 3,158,409 | 11/1964 | Hughson | 303—48 X |
| 3,192,382 | 6/1965 | Allison | 303—20 X |
| 3,260,553 | 7/1966 | Jeffrey | 303—3 X |

DUANE A. REGER, *Primary Examiner.*

U.S. Cl. X.R.

303—20